No. 671,501. Patented Apr. 9, 1901.
H. STAUB.
CANDY MOLD.
(Application filed May 3, 1898.)
(No Model.)
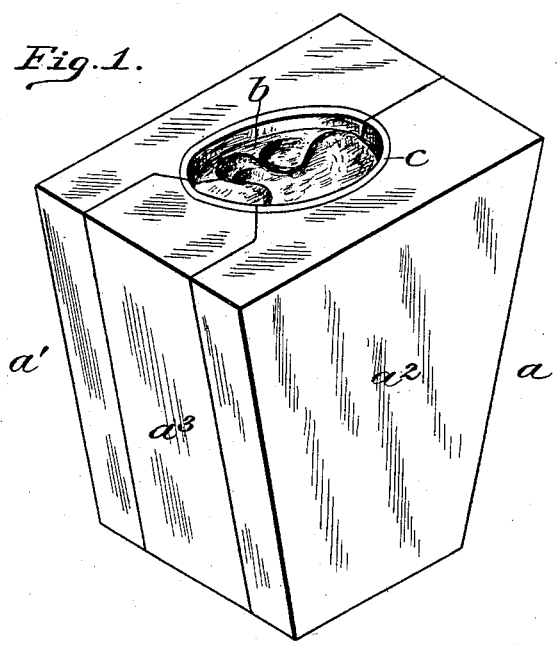
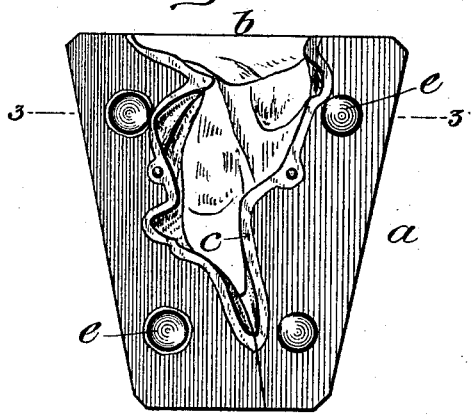
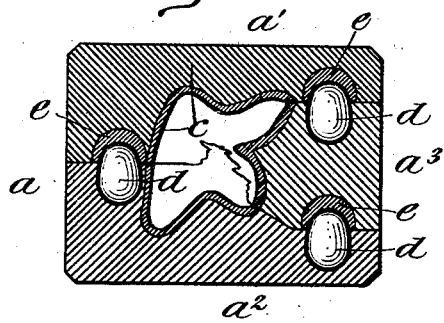
Witnesses:
Walter Samariss
G. C. Raymond
Inventor:
Henry Staub
By Kay & Totten
Attorneys.

UNITED STATES PATENT OFFICE.

HENRY STAUB, OF ALLEGHENY, PENNSYLVANIA, ASSIGNOR OF ONE-HALF TO REYMER & BROTHERS, OF PITTSBURG, PENNSYLVANIA.

CANDY-MOLD.

SPECIFICATION forming part of Letters Patent No. 671,501, dated April 9, 1901.

Application filed May 3, 1898. Serial No. 679,601. (No model.)

*To all whom it may concern:*

Be it known that I, HENRY STAUB, a resident of Allegheny, in the county of Allegheny and State of Pennsylvania, have invented a new and useful Improvement in Candy-Molds; and I do hereby declare the following to be a full, clear, and exact description thereof.

My invention relates to molds for molding candy figures.

The object of my invention is to provide a durable form of mold which does not heat through quickly and which can be readily cooled when heated.

To these ends my invention consists, generally stated, in a partible mold-body formed of plaster-of-paris or like absorbent plastic material, with a matrix formed therein lined with metal, the plaster-of-paris being exposed on all sides, so that when submerged in water for cooling it will absorb the same freely.

To enable others skilled in the art to make and use my invention, I will describe the same more fully, referring to the accompanying drawings, in which—

Figure 1 is a perspective view of a mold embodying my invention. Fig. 2 is a view of the mold with one of the sections removed. Fig. 3 is a cross-section on the line 3 3, Fig. 2.

Like letters of reference indicate like parts in each view.

The letter $a$ designates the mold-body, which may be of any suitable form and which is composed of the sections $a'$ $a^2$ $a^3$. When these several sections are joined together as a whole, they form at one end the pouring-opening $b$. These mold-sections $a'$ $a^2$ $a^3$ are formed of plaster-of-paris or other absorbent plastic material. Each mold-section has formed on its inner face a portion of the matrix, so that in conjunction they form the matrix in which the figure is cast. The matrix has the metal lining $c$. Any suitable metal may be employed.

The mold-sections have studs $d$, of suitable material, which are adapted to enter corresponding depressions which may be in the form of metal thimbles $e$, so that when the mold-sections are brought together they are interlocked.

In the mold illustrated the matrix is in the form of a rabbet, as will be apparent by inverting Fig. 2. The hot candy in liquid form is poured by the pouring-opening $b$ into the matrix. When the candy has cooled sufficiently to retain its shape, the mold is taken apart and the object removed.

By having the body of the mold formed of plaster-of-paris it does not heat up quickly, and when the metal of the matrix gets highly heated the mold is dipped into water. Owing to the absorbent properties of the plaster-of-paris the water penetrates the mold-body and quickly reduces the temperature of the metal, so that the mold can be used again without delay. The plaster-of-paris becomes saturated with the water and keeps the mold cool for a longer period of time, so that the articles can be molded in quick succession in the same mold, and they chill quicker, so that the candy hardens more rapidly, and the mold can be opened and the molded article be taken therefrom without having to stand for any great length of time in order to allow it to set. This is of particular advantage where candy is being molded, as it is not like metal and does not chill quickly.

What I claim as my invention, and desire to secure by Letters Patent, is—

1. A mold for molding candy articles composed of an unprotected body of hard porous material having a matrix therein lined with metal, substantially as set forth.

2. A candy-mold comprising separable parts, each of which consists of a body of hard, porous material, such as plaster-of-paris, having an exposed exterior surface and a permanently-attached metal lining, substantially as described.

In testimony whereof I, the said HENRY STAUB, have hereunto set my hand.

HENRY STAUB.

Witnesses:
ROBT. D. TOTTEN,
JOHN N. DUNN.